United States Patent
Han

(10) Patent No.: US 8,170,085 B2
(45) Date of Patent: May 1, 2012

(54) MULTIPATH ERROR ESTIMATION IN SATELLITE NAVIGATION RECEIVERS

(75) Inventor: Shaowel Han, Palo Alto, CA (US)

(73) Assignee: CSR Technology Holdings Inc., Sunnyvale, CA (US)

( * ) Notice: Subject to any disclaimer, the term of this patent is extended or adjusted under 35 U.S.C. 154(b) by 1154 days.

(21) Appl. No.: 11/372,739

(22) Filed: Mar. 9, 2006

(65) Prior Publication Data

US 2007/0211793 A1    Sep. 13, 2007

(51) Int. Cl.
*H03K 9/00* (2006.01)
*H04L 27/00* (2006.01)

(52) U.S. Cl. .................................. 375/150; 375/316

(58) Field of Classification Search ............... 375/150, 375/316
See application file for complete search history.

(56) References Cited

U.S. PATENT DOCUMENTS

| | | | |
|---|---|---|---|
| 5,185,610 A | 2/1993 | Ward | |
| 5,414,729 A | 5/1995 | Fenton | 375/209 |
| 5,692,008 A | 11/1997 | Van Nee | 375/209 |
| 5,726,659 A | 3/1998 | Kee et al. | 342/352 |
| 5,771,456 A | 6/1998 | Pon | 455/456 |
| 5,901,171 A | 5/1999 | Kohli et al. | 375/200 |
| 5,963,601 A | 10/1999 | Pon et al. | 375/346 |
| 6,023,489 A | 2/2000 | Hatch | 375/208 |
| 6,047,017 A | 4/2000 | Cahn et al. | 375/200 |
| 6,163,567 A | 12/2000 | Hatch | 375/149 |
| 6,249,542 B1 | 6/2001 | Kohli et al. | 375/150 |
| 6,393,046 B1 | 5/2002 | Kohli et al. | 375/134 |
| 6,466,612 B2 | 10/2002 | Kohli et al. | 375/150 |
| 6,484,098 B1 | 11/2002 | Takemura | 701/213 |
| 6,727,846 B1 | 4/2004 | Brown | 342/357.06 |
| 6,792,035 B2 | 9/2004 | Kontola | 375/148 |
| 6,804,494 B2 | 10/2004 | Fernandez-Corbaton et al. | 455/65 |
| 6,868,110 B2 | 3/2005 | Phelts et al. | 375/144 |
| 6,917,644 B2 | 7/2005 | Cahn et al. | 375/142 |
| 2002/0101912 A1* | 8/2002 | Phelts et al. | 375/148 |
| 2003/0072356 A1 | 4/2003 | Abraham et al. | 375/148 |
| 2005/0032477 A1 | 2/2005 | Fernandez-Corbaton et al. | 455/65 |
| 2006/0140254 A1* | 6/2006 | Pietila et al. | 375/147 |
| 2006/0232467 A1* | 10/2006 | Small | 342/357.09 |

OTHER PUBLICATIONS

Irsigler et al. "Multipath Performance Analysis for Future GNSS Signals", Proceedings of the National Technical Meeting of the Satellite Division of the Institute of Navigation, ION NTM 2004, Jan. 26-28, 2004, San Diego, California.

Schmid et al. "Enabling Location Based Services With a Combined Galileo/GPS Recceiver Architecture", Proceedings of the International Technical Meeting of the Satellite Division of the Institute of Navigation, ION GNSS 2004, Sep. 21-24, 2004, Long Beach California.

* cited by examiner

Primary Examiner — Chieh M Fan
Assistant Examiner — Freshteh N Aghdam
(74) Attorney, Agent, or Firm — Pillsbury Winthrop Shaw Pittman LLP

(57) ABSTRACT

The invention presented in this disclosure gives methods to estimate and compensate for the multi-path in a typical navigational or spread spectrum receiver. The multi-path delay is estimated based on the outputs of different correlators of the receiver. Unlike three correlators normally used, the present disclosure uses five correlators, namely, Early2 (E2), Early1 (E1), Prompt (P), Late1 (L1) and Late2 (L2). The possible multi-path scenarios are classified into six different cases depending upon the reflected signal delay and the errors are computed. Further, the algorithm in the present disclosure can be extended to any correlators spacing.

18 Claims, 15 Drawing Sheets

| | Case 1 | Case 2 | Case 3 | Case 4 | Cases 5&6 |
|---|---|---|---|---|---|
| $\delta$ | $\delta \leq \tau_0 + 1/3$ | $\tau_0 + 1/3 < \delta \leq \tau_0 + 2/3$ | $\tau_0 + 2/3 < \delta \leq \tau_0 + 1$ | $\tau_0 + 1 < \delta \leq 4/3$ | $\delta \geq 4/3$ |
| $\tau_0$ | $\tau_0 = \dfrac{\alpha\delta}{1+\alpha}$ | $\tau_0 = \alpha/3$ | $\tau_0 = \dfrac{\alpha(4/3 - \delta)}{2-\alpha}$ | $\tau_0 = \dfrac{\alpha(4/3 - \delta)}{2-\alpha}$ | $\tau_0 = 0$ |
| Any $\alpha$ | No solution | $\tau_0 = E2 - 1/3$<br>$\tau_0 = -1/3 + (E1+L2)/3$ | $\tau_0 = E2 - 1/3$<br>$\tau_0 = E1 - 2/3$<br>$\tau_0 = L1 - 2/3$ | $\tau_0 = E2 - 1/3$<br>$\tau_0 = E1 - 2/3$<br>$\tau_0 = L1 - 2/3$ | |
| $\alpha \geq 0$ | $\tau_0 = 3(E1+L1)/8 - P/2$ or<br>$\tau_0 = (E1+E2+L1+L2)/4 - P/2$<br>$\tau_0 = (E1+E2)/2 - P/2$ | $\tau_0 = 1/3 - (P - L1)$<br>$\tau_0 = 1/3 - (P - E1)$<br>$\tau_0 = -2/3 + (P+L2)/2$ | $\tau_0 = -2/3 + (P+L2)/2$ | $\tau_0 = 1 - P$ | |
| $\alpha < 0$ | No solution | $\tau_0 = -1/3 + (P - E1)$<br>$\tau_0 = -1/3 + (P - L1)$<br>$\tau_0 = -1/3 + (P+L2)/4$ | $\tau_0 = -1/3 + (P+L2)/4$ | $\tau_0 = P - 1$ | |

*n.b.*: When $\delta \geq 4/3$, L2 will still be affected by multipath until $\delta \geq 5/3$ although $\tau_0 = 0$.

FIG. 13

MULTIPATH ERROR ESTIMATION IN SATELLITE NAVIGATION RECEIVERS

FIELD OF THE INVENTION

The present invention relates generally to navigational and spread spectrum signal receivers. More specifically, it relates to techniques for estimating and compensating the error due to multi-path.

BACKGROUND OF THE INVENTION

The global positioning system (GPS) is a satellite-based radio-navigation system built and operated by the United States Department of Defense. The system uses twenty-four satellites orbiting the earth at an altitude of about 11,000 miles with a period of about twelve hours. Some additional satellites may be present as spares. These satellites are placed in six different orbits such that at any time a minimum of six satellites are visible at any location on the surface of the earth except in the polar region. Each satellite transmits a time and position signal referenced to an atomic clock. A typical GPS receiver locks on to this signal and extracts the data contained in it. Using signals from sufficient number of satellites, a GPS receiver can calculate its position, velocity, altitude, and time.

The GPS receivers can operate in many modes. In a "hot start" mode, the receiver already has the time, its last position, and the information on satellite position (also known in the art as almanacs or ephemeris) stored in its memory. The receiver can use this stored information to determine which satellites are probably visible, and it can then lock on those satellite signals in a short time. On the other hand, the receiver may have no prior data on its position, time, or almanacs stored. In this "cold start" mode, the receiver has to search for signals from all of the satellites present in the constellation. There are some other modes where partial information on time, position and almanacs are available and corresponding start mode is known as "warm start."

The GPS receiver has to acquire and lock on to at least four satellites in order to derive the position, velocity and time. Usually, a GPS receiver has many parallel channels, each receiving signals from a separate visible GPS satellite. The acquisition of the satellite signals involves a two-dimensional search of frequency and the PN code phase. Each satellite transmits a unique PN code which repeats every millisecond. The receiver locally generates a replica frequency and a replica code phase and correlates these with the received satellite signals. The PN code has to be searched in at least 2046 phases and the frequency search depends upon the Doppler frequency due to relative motion between the satellite and the receiver. Additional frequency variation may result due to local oscillator instability.

The GPS receiver computes an estimate of the line-of-sight distance from the satellite to the receiver which may include errors due to receiver clock bias, and other effects. This estimated distance is known as the pseudo-range. The estimate of the pseudo-range often contains additional errors due to multi-path, i.e., the reflection of the signals by many objects like buildings, mountains, etc. as they propagate from the satellite to the receiver. This reception of both line-of-sight and reflected signals often results in the computation of inaccurate pseudo-range, and thus also introduces errors in the estimated position of the receiver. Due to the superposition of the direct and reflected signals (which are slightly delayed), the resulting correlation pattern deviates from its usual triangular shape exhibiting a multi-peak correlation curve. The earliest correlation peak corresponds to the direct signal, but the position of the peak may be shifted from its true position due to the superposition of the direct and reflected signals. This shift in the position of the correlation peak results in pseudo-range error and error in the computed receiver position. Further, the early and late correlators adjust their values to be equal and force the prompt correlator to remain at the center. Thus the prompt correlator represents the wrong peak. This has been discussed later in this section. This reception scenario may be more complex in the presence of plurality of reflected signals.

There are several known methods available to estimate and compensate for the error due to multi-path. One of the most popular and widely used methods is the use of narrow correlators. The correlators in a spread spectrum or GPS receiver give the correlation values for different phase shifts between the received and local PN sequence. Usually the separation is about half of a chip, where a chip is one bit of the PN sequence. In GPS navigation, a half-chip delay corresponds to about 150 meters of distance. So, if the reflected signal has a pseudo-range which is 150 meters more than the direct signal, it contributes to the energy of the next correlator also known as L (late) correlator, rather than to the correct correlator known as P (prompt). Thus, the resulting correlation curve may shift the peak towards the L correlator. When the pseudo-range change is different from 150 meters, the correlation curve may take a different shape. When the correlators are placed closer than a half chip apart, a reflected signal may peak in one of these correlators, so the true and reflected signals may be separated. The use of narrow correlators, however, increases the hardware complexity and power consumption. Use of a multi-antenna system to nullify the gain in the direction of multi-path is another technique employed which is useful mostly in static conditions. The ground-plane and helical shield are useful only under static conditions. The other methods of multi-path mitigation include the one based on the level of stability of pseudo-range as given in U.S. Pat. No. 6,484,098, use of L1 and L2 signals as in U.S. Pat. No. 5,185,610, use of multi-bit correlators as in U.S. Pat. No. 6,393,046, based on data bits as in U.S. Pat. No. 5,963,601, velocity based as in U.S. Pat. No. 5,771,456, satellite trajectory based as given in U.S. Pat. No. 5,726,659, may be based on the variation in SNR, using wavelets or maximum likelihood (ML) or Minimum Mean-Square-Error (MMSE) methods. But most of these methods may not provide good multi-path mitigation below certain value of multi-path length or in some other cases it may involve lot of computation. Some of these techniques are useful only when one multi-path component is present while in practice there may be many possible reflected components.

But recently, multi-path mitigation techniques based on correlator outputs such as Early (E), Prompt (P), Late (L) have been developed. These are based on the fact that the earliest component at the receiver is the direct signal while various reflected signals arrive later and contribute to the later correlator outputs. The patent application publication US2005/0032477A1 of Qualcomm Inc uses stored correlation curves and compares them with the present correlation curve to determine the multi-path. This stored patterns technique also includes mathematical models. But this requires lot of storage memory and also the comparison may not hold good under all conditions. The U.S. Pat. Nos. 5,692,008 issued to NovAtel and 6,917,644 issued to SiRF determine the shift in prompt correlator position due to the requirement E=L, the E and L being subjected to different levels of reflected signal power. The SiRF patent takes into account only the E, P and L correlators in determining multi-path while the NovAtel does not specifically give any number of correlators. Another method reported in the mitigation of the multi-path effect is the double delta technique. This technique uses five correlators but it has the disadvantage that it requires a high precision measurement of E2, E1, L1 and L2 values because the measured differences (E1–L1) and (E2–L2) are usually very small.

Accordingly, there is a need in the art for a navigational satellite signal receiver to be able to detect and compensate for the multi-path effects beyond E, P and L correlators.

SUMMARY OF THE INVENTION

The invention presented in this disclosure provides methods to estimate and compensate for the multi-path error in a typical navigational or spread spectrum receiver. The multi-path delay is estimated based on the outputs of different correlators of the receiver. Unlike three correlators normally used, the present methods use five correlators, namely, Early2 (E2), Early1 (E1), Prompt (P), Late1 (L1) and Late2 (L2). The possible multi-path scenarios are classified into six different cases depending upon the reflected signal delay and the errors are computed. Further, the methods can be extended to any correlator spacing.

According to one aspect of the invention, a method of detecting and compensating for receiver timing errors due to multi-path in a spread spectrum receiver is provided. The method includes receiving signals from a remote transmitter and generating a local PN sequence that is then correlated with the received signals. The correlation is performed at five different code phases to produce five corresponding correlation values. The five different code phases are separated by an interval of at least one-third of a chip of the local PN sequence. Using at least one of the five correlation values, a time delay error due to multi-path error is estimated. The estimated time delay error is then used to compensate a receiver timing error due to the multi-path.

In a preferred embodiment, the time delay error is estimated using a single mathematical expression for all delays and polarities of a received reflected signal. The time delay error may be estimated, for example, by determining from the correlation values one of multiple formulas, and then calculating the time delay error using the determined formula. Already available power values from different correlators may be used to improve accuracy of the estimated time delay error.

The method may also include refining a code-phase increment by averaging a ratio of the power of a second correlator to a prompt correlator. The averaging may be, for example, a moving average or other smoothing technique. Preferably, the averaging uses an averaging period larger than a multi-path period.

BRIEF DESCRIPTION OF THE DRAWINGS

FIG. 13 illustrates a computation formula applied to three cases: (1) any $\alpha$, (2) when $\alpha \geq 0$, and (3) when $\alpha < 0$.

DETAILED DESCRIPTION

Figure 1:
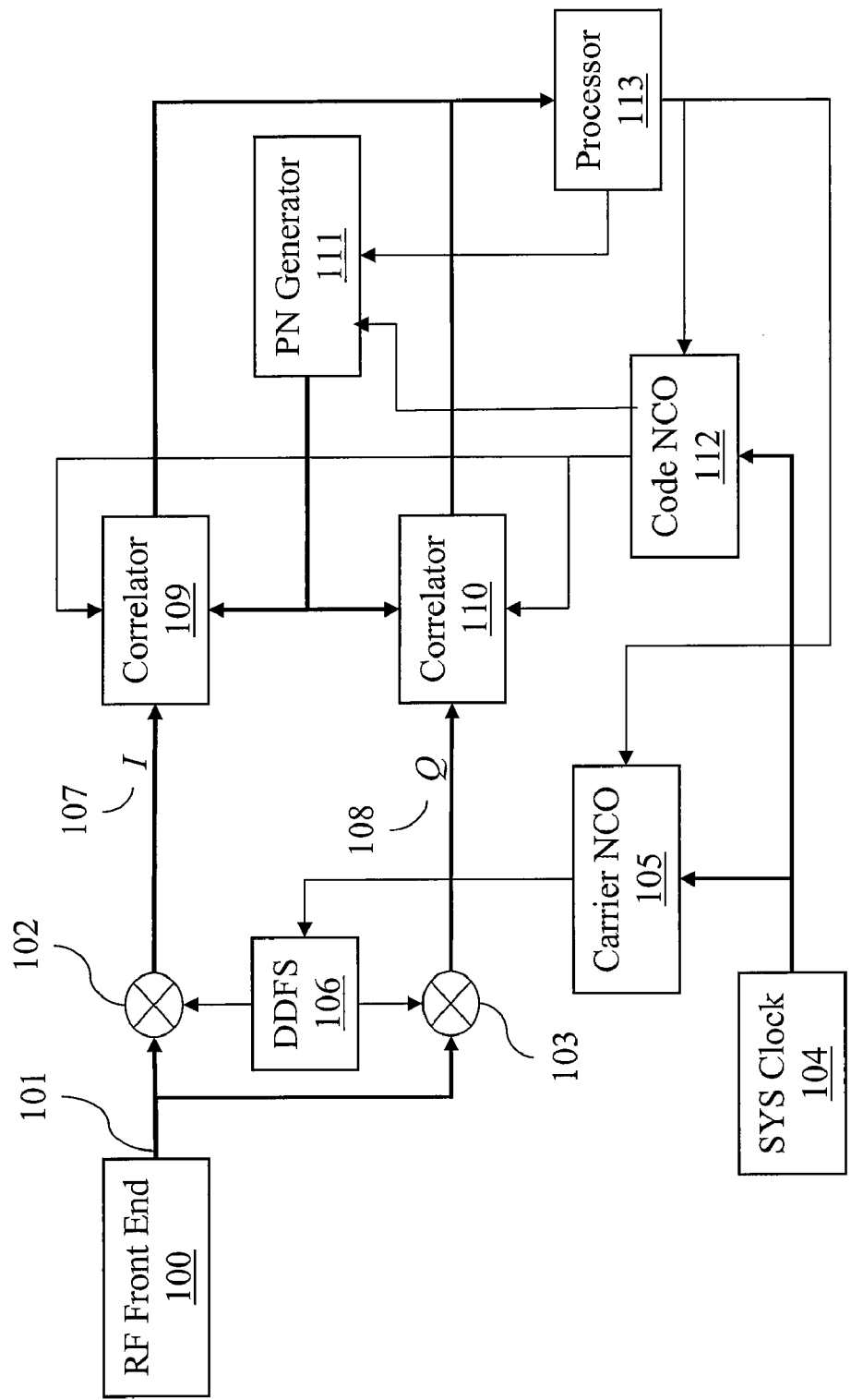
FIG. 1 is a block diagram illustrating a GPS baseband section according to an embodiment of the invention.

A receiver according to an embodiment of the present invention is illustrated in FIG. 1. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase (I) component 107. In a parallel path the same signal 101 is multiplied by the DDFS frequency in quadrature (i.e., with a phase shift of 90 degrees) to produce quadrature (Q) component 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of ADC output 101. Thus the I and Q signals produced by the IF mixers 102 and 103 are baseband signals, i.e., near zero carrier frequency. The I and Q signals may be low-pass filtered to remove the high frequency components which are equal to twice the IF frequency band.

The I and Q components 107 and 108 are correlated in correlators 109 and 110, respectively, with a locally-generated PN sequence generated by a PN generator 111. The PN-sequence corresponds to the channel being processed by the baseband section at that time. The PN sequence generator is driven by code NCO 112. The local code generator frequency is made equal to the code rate of I and Q paths by corrective feedback from processor 113 to the code NCO 112. In addition, processor 113 sends a signal to PN code generator 111 to set the starting phase of the locally generated code. The NCO 112 provides the correct clock signals to correlators 109 and 110. For example, NCO 112 provides a clock signal to generate two samples per PN chip in the signal acquisition stage and three samples per chip during the tracking stage. SYS CLK 104 provides to NCO 105 and NCO 112 a common clock synchronization signal. The correlator output values are then sent to processor 113 at every millisecond interval. The processor 113 may be a digital signal processor (DSP) core. Subsequent processing of the signals takes place in the processor 113, as will be described in detail below. Additional details of the receiver baseband section described above are contained in U.S. patent application Ser. No. 11/123,861 filed May 6, 2005, which is incorporated herein by reference.

The DSP core 113 receives one millisecond integrated (correlated) I and Q values from the GPS baseband section described above. In order to acquire a GPS signal in the DSP processor, all dwells (i.e., pairs of carrier frequency and code phase values) are searched. It is a two-dimensional search. Coherent integration and non-coherent integration are two commonly used integration methods to acquire GPS signals. Coherent integration provides better signal gain at the cost of larger computational load, for equal integration times.

Figure 2A:
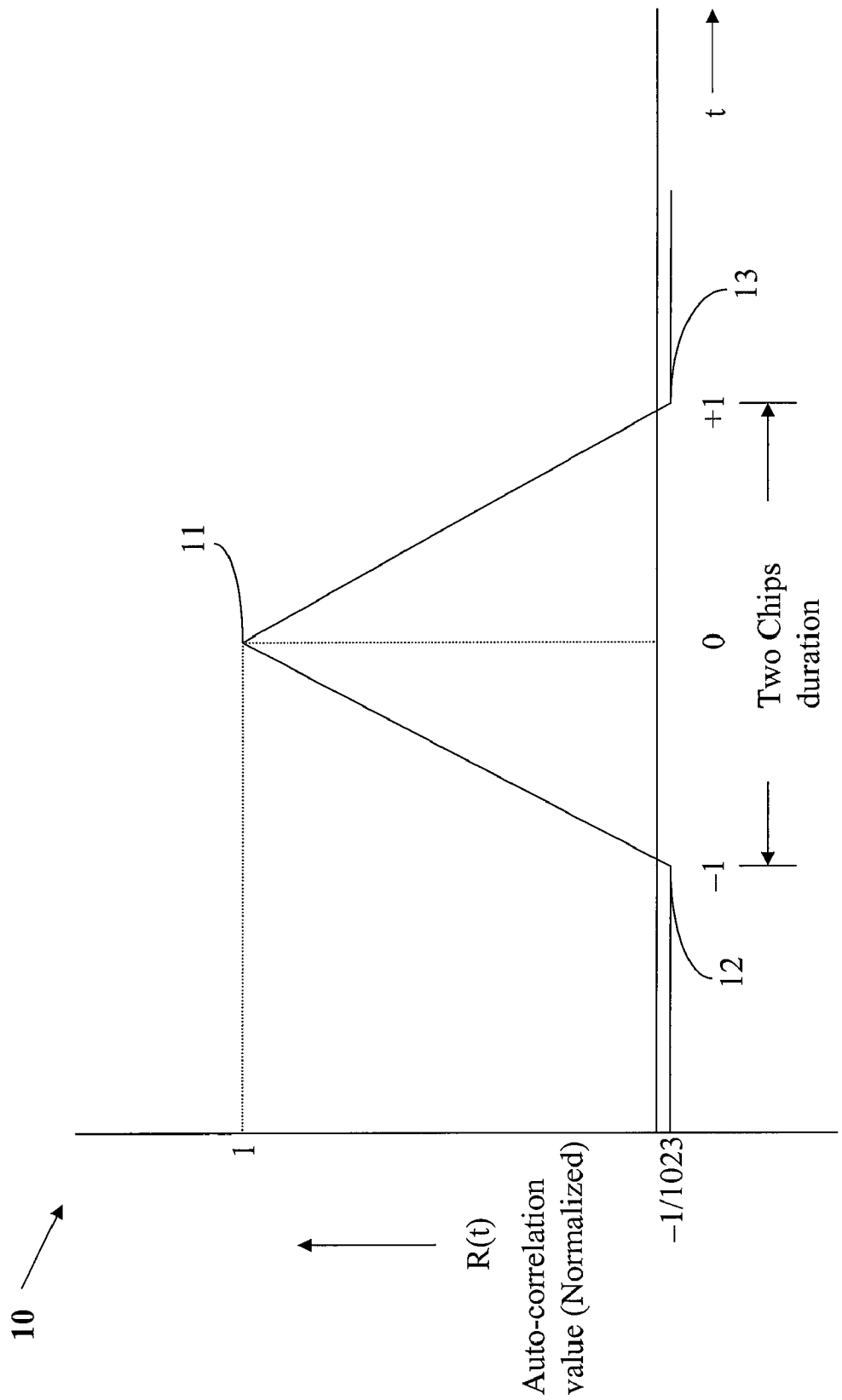
FIG. 2A is the ideal correlation of a PN sequence used in a spread spectrum communication.

A spread spectrum or navigation receiver employing spread spectrum techniques compares or correlates the received signal samples with the locally generated replica, both being spread by the same PN sequence. The phase of the local replica is changed until a high correlation value indicative of the synchronization has been reached. The correlation value curve usually has a triangular shape as shown in 10 of FIG. 2A. The maximum of 1023 (for Gold code of length 1023) for zero phase offset is shown as 11 and linearly decreasing to −1 when the phase offset is one chip on either side of the maximum as indicated by 12 and 13. Alternatively, the high correlation point can be represented by a normalized value of 1 and the lower value is −1/1023.

Figure 2B:
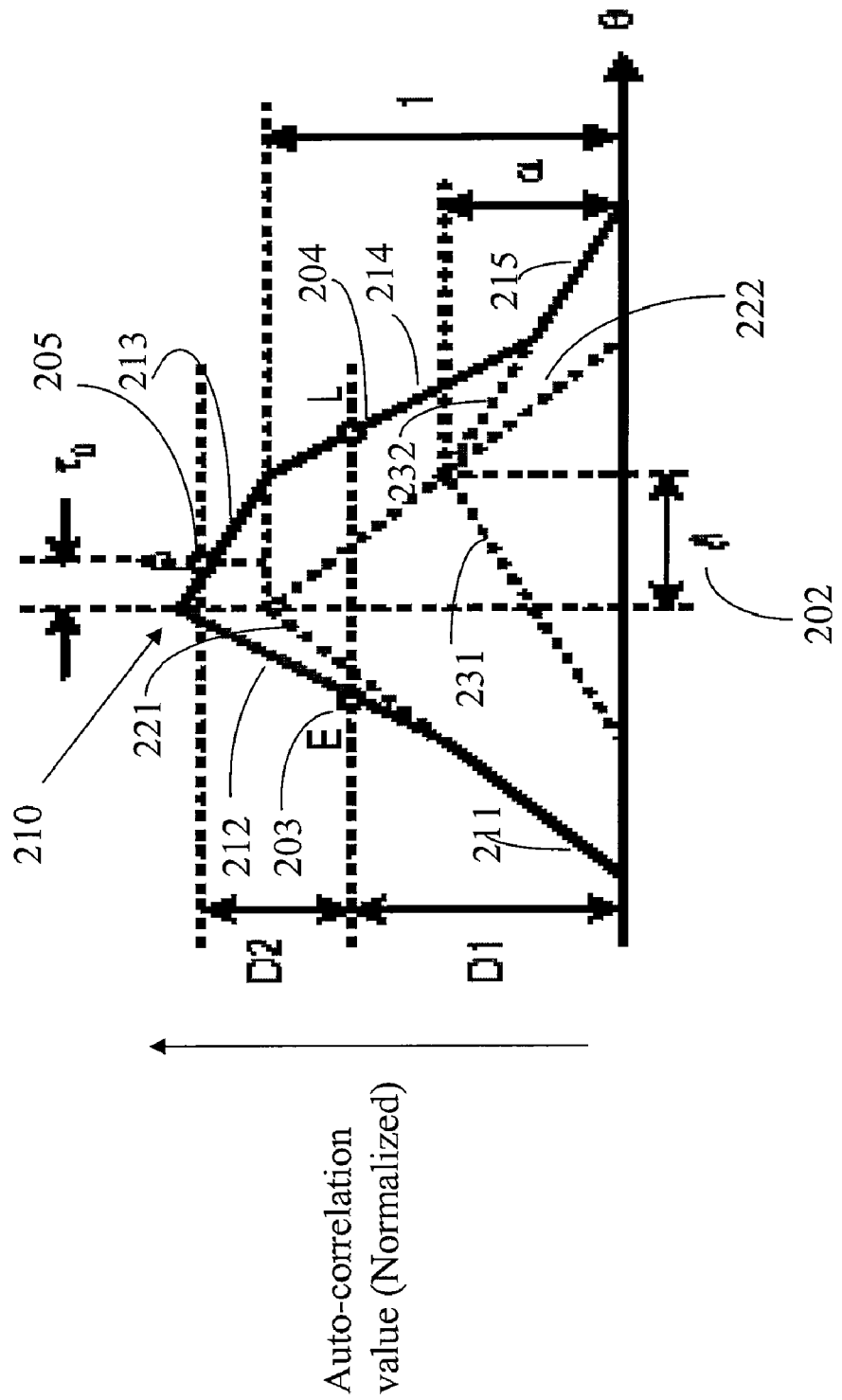
FIG. 2B is a typical correlation curve with both the direct and a single reflected or multi-path signal.

FIG. 2B represents the variation of the correlation value when a reflected signal or multi-path is present. The correlation due to the superposition of the direct and reflected signal is shown by the curve 210. The non-linear curve 210 consists of various linear components 211, 212, 213, 214 and 215 due to the superposition of the direct and multi-path signals. The correlation triangle due to the direct signal is represented by the sides 221 and 222. The correlation triangle due to the reflected signal is represented by the sides 231 and 232. The superposition of these two triangles results in the correlation curve 210. The portion 211 is due to the direct signal, the portion 212 is due to the superposition lead sides 221 and 231 of direct and reflected signals, respectively. The linear portion 213 is the result of superposition of trailing edge 222 of the direct signal and leading edge 231 of the reflected signal. The linear portion 214 of the resultant signal is due to the superposition of the trailing edge 222 of the direct signal and 232 of the reflected signal and finally the linear portion 215 is due to the trailing edge of the reflected signal. The delay between the direct signal and the reflected signal is given by 202 or $\delta$ shown as the distance between the correlation peaks. The correlation peak value is 1 for the direct signal while for the reflected signal it is $\alpha$. A basic spread spectrum or GPS receiver usually has three correlators the Early (E), prompt (P) and Late (L). While a signal is being tracked, the power level of E as given by 203 and the power level 204 represented by L will be forced by Delay Lock Loop (DLL) of the receiver such that power of E=power of L. This will force the prompt correlator to be at the center of E and L at P indicated as 205. The corresponding correlation power will be equal to (D1+D2) where D1 is the correlation power of E or L. Thus it is seen from the FIG. 2B, that prompt correlator has been shifted by $\tau_0$ with respect to the peak of the direct signal. Thus $\tau_0$ represents the error in time computation due to the multi-path. This error has to be determined to correct for any multi-path error in the pseudo-range.

Figure 3:
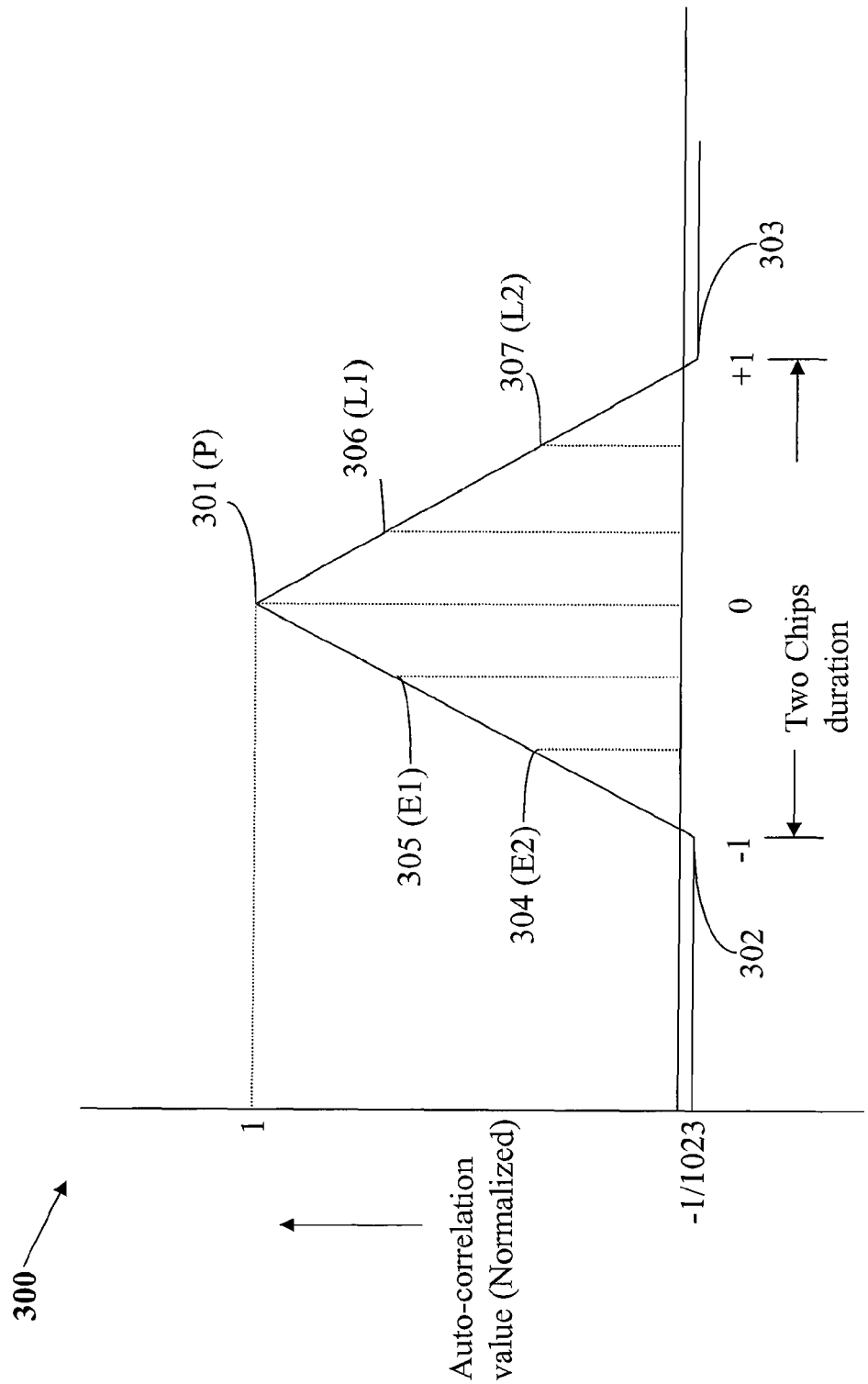
FIG. 3 is the ideal correlation triangle for a correlator spacing of ⅓ of a chip.

When correlators are spaced more closely, there will be more than one Early and Late points on the early-side and late-side edge of the correlation curve. In one of the embodiments considered here and shown in FIG. 3, there are two early correlators denoted as 305 (E1) and 304 (E2) and two late correlators denoted as 306 (L1) and 307 (L2). The positioning of these correlators and corresponding auto-correlation values are also shown in FIG. 3 for direct signal with no multi-path. In general, the five different code phases that generate the E1, E2, P, L1, L2 correlation values are separated by an interval of at least one-third of a chip of the local PN sequence. In the case shown in FIG. 3, the correlation value at 305 or 306 is ⅔ of the value at 301 while it is ⅓ at 304 and 307. As already seen, the triangular form will be distorted when multi-path is present.

Using at least one of the five correlation values, a time delay error due to multi-path error is estimated. The estimated time delay error is then used to compensate a receiver timing error due to the multi-path. In a preferred embodiment, the time delay error is estimated using a single mathematical expression for all delays and polarities of a received reflected signal. Based on the correlation values, a multipath scenario and corresponding formula is determined. The time delay error is then calculated using the selected formula, as will be described in detail below.

A mathematical analysis is presented below to determine the power of various correlators under different delays of reflected signal. Under ideal conditions with no multi-path the triangular correlation given in FIG. 1 may be represented by, $$R(t) = \begin{cases} 1 - |t|, & |t| \le 1 \\ 0, & |t| \ge 1 \end{cases} \tag{1}$$

Where R(t) is the correlation value and t is the delay between the two correlating signals. The following analysis has been made for Early Late spacing at 1 chip and also a detailed analysis for Early Late spacing at ⅔ chip. The section A is on Early Late spacing at 1 chip while section B is for a spacing at ⅔ chip.

A. Early Late Spacing at 1 Chip

The values of Early (E), Late (L) and Prompt (P) for Early Late spacing of one chip duration may be given as, $$E = R(\tau_0 - 0.5) + \alpha R(0.5 - \tau_0 + \delta) \tag{2}$$

$$L = R(\tau_0 + 0.5) + \alpha R(0.5 + \tau_0 - \delta) \tag{3}$$

$$P = R(\tau_0) + \alpha R(\tau_0 - \delta)) \tag{4}$$

where $\tau_0$ is the time error due to multi-path, $\alpha$ is the maximum correlation due to the reflected signal and $\delta$ is the time shift between the correlation maximum values due to direct and reflected signals. These variables are illustrated in FIG. 2B.

When the signal is being tracked, the Delay Lock Loop (DLL) will force E=L and the following equation can be derived:

$$\tau_0 = \frac{\alpha \delta}{1 + \alpha} \tag{5}$$

under the condition $\delta < \tau_0 + 0.5$, and $$\tau_0 = \frac{\alpha(1.5 - \delta)}{2 - \alpha} \tag{6}$$

under the condition that $\delta > \tau_0 + 0.5$.

B. Early Late Spacing at ⅔ Chip

The correlator spacing is as shown in FIG. 3 where the E1 and L1 are spaced at ⅔ chip apart. There is another set of correlators E2 and L2 which are at ⅓ chip away from E1 and L1, respectively. Both of these sets can be used to determine the time error due to multi-path. The peak, P, is at the center.

Figure 4:
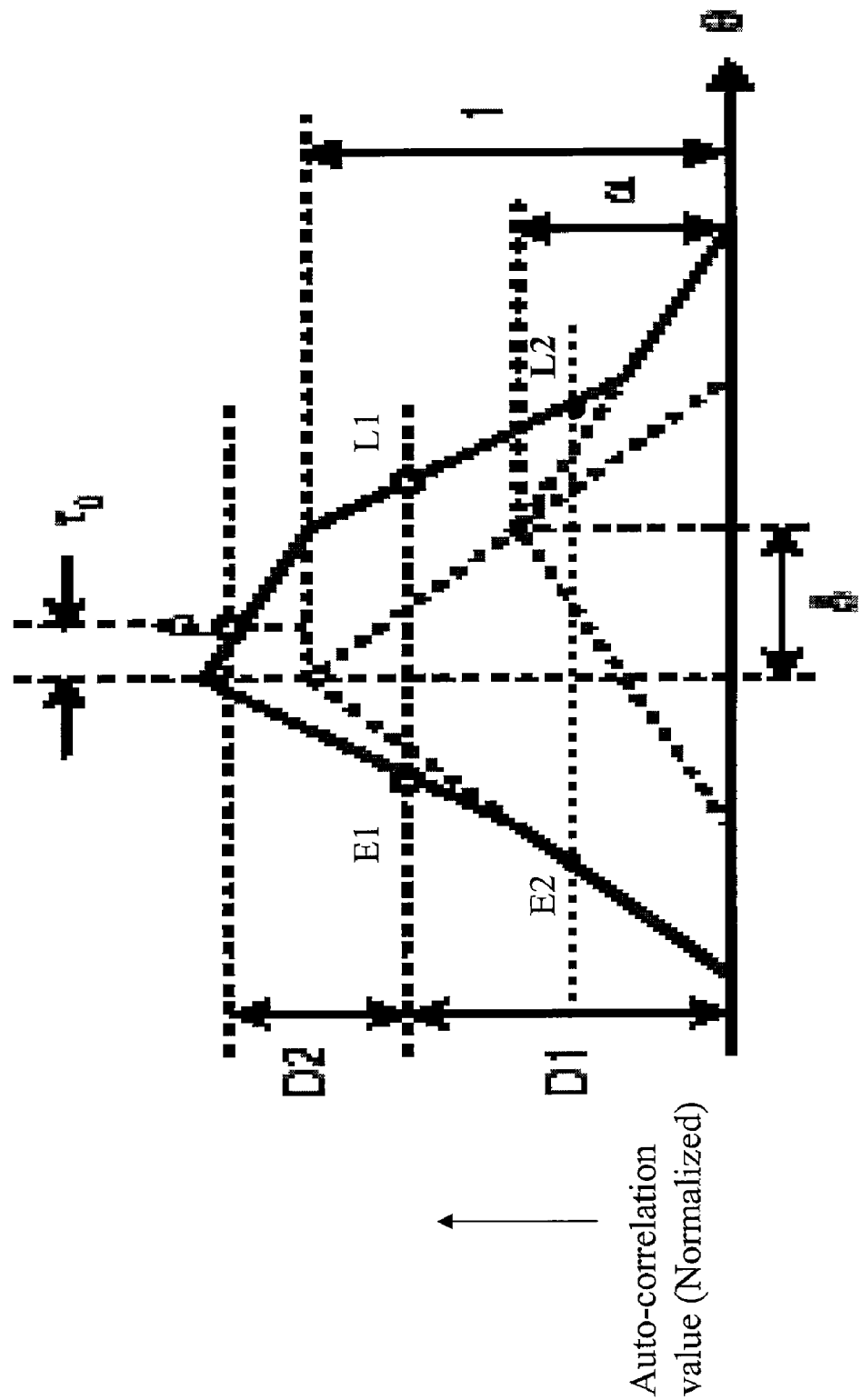
FIG. 4 is a typical correlation curve with both the direct and a single reflected or multi-path signal with a correlator spacing of ⅓ of a chip.

When multi-path is present, the correlation values are shown in FIG. 4. The E1, E2, L1, L2 and P for this case are:

$$E2 = R(\frac{2}{3}-\tau_0) + \alpha R(\frac{2}{3}-\tau_0+\delta) \quad (7)$$

$$E1 = R(\frac{1}{3}-\tau_0) + \alpha R(\frac{1}{3}-\tau_0+\delta) \quad (8)$$

$$P = R(\tau_0) + \alpha R(\tau_0-\delta)) \quad (9)$$

$$L1 = R(\frac{1}{3}+\tau_0) + \alpha R(\frac{1}{3}+\tau_0-\delta) \quad (10)$$

$$L2 = R(\frac{2}{3}+\tau_0) + \alpha R(\frac{2}{3}+\tau_0-\delta) \quad (11)$$

Different cases, in which the shift δ takes values in different ranges can be considered as follows:

CASE 1: $\delta \leq \tau_0 + \frac{1}{3}$     (15)

In this case we have $$E2 = R(2/3 - \tau_0) + \alpha R(2/3 - \tau_0 + \delta) \quad (12)$$
$$= 1 - (2/3 - \tau_0) + \alpha(1 - (2/3 - \tau_0 + \delta))$$
$$= (1+\alpha)/3 + \tau_0(1+\alpha) - \alpha\delta$$

$$E1 = R(1/3 - \tau_0) + \alpha R(1/3 - \tau_0 + \delta) \quad (13)$$
$$= (1 - (1/3 - \tau_0)) + \alpha(1 - (1/3 - \tau_0 + \delta))$$
$$= 2/3(1+\alpha) + \tau_0(1+\alpha) - \alpha\delta$$

$$L1 = R(1/3 + \tau_0) + \alpha R(1/3 + \tau_0 - \delta) \quad (14)$$
$$= 1 - (1/3 + \tau_0) + \alpha(1 - (1/3 + \tau_0 - \delta))$$
$$= 2/3(1+\alpha) - \tau_0(1+\alpha) + \alpha\delta$$

$$L2 = R(2/3 + \tau_0) + \alpha R(2/3 + \tau_0 - \delta) \quad (15)$$
$$= 1 - (2/3 + \tau_0) + \alpha(1 - (2/3 + \tau_0 - \delta))$$
$$= 1/3(1+\alpha) - \tau_0(1+\alpha) + \alpha\delta$$

The DLL will force E1=L1. The following equations can be derived:

$$\tau_0 = \frac{\alpha\delta}{1+\alpha} \quad (16)$$

$$E2 = (1+\alpha)/3 \quad (17)$$

$$E1 = 2(1+\alpha)/3 \quad (18)$$

$$L1 = 2(1+\alpha)/3 \quad (19)$$

$$L2 = (1+\alpha)/3 \quad (20)$$

If $\alpha \geq 0$ then $$P = R(\tau_0) + \alpha R(\tau_0 - \delta)) \quad (21)$$
$$= 1 - \tau_0 + \alpha(1 - (\delta - \tau_0))$$
$$= 1 + \alpha - \tau_0 + \alpha\tau_0 - \alpha\delta$$

$$\tau_0 = 3(E1+L1)/8 - P/2 \quad (22)$$
or
$$\tau_0 = (E1+E2+L1+L2)/4 - P/2 \quad (23)$$

$$\tau_0 = (E1+E2)/2 - P/2 \quad (24)$$

If $\alpha < 0$ then $$P = R(\tau_0) + \alpha R(\tau_0 - \delta)) \quad (25)$$
$$= 1 + \tau_0 + \alpha(1 - (\delta - \tau_0))$$
$$= 1 + \alpha + \tau_0 + \alpha\tau_0 - \alpha\delta$$
$$= 1 + \alpha$$

$$3(E1+L1)/8 - P/2 = 0 \quad (26)$$

In this case, there is no way to derive $\tau_0$ and δ from E1, L1 and P.

CASE 2: $\tau_0 + \frac{1}{3} < \delta \leq \tau_0 + \frac{2}{3}$     (27)

No multipath relfection on E2. In this case have $$E2 = R(2/3 - \tau_0) = 1 - (2/3 - \tau_0) = 1/3 + \tau_0 \quad (28)$$

$$E1 = R(1/3 - \tau_0) + \alpha R(1/3 - \tau_0 + \delta) \quad (29)$$
$$= (1 - (1/3 - \tau_0)) + \alpha(1 - (1/3 - \tau_0 + \delta))$$
$$= 2/3(1+\alpha) + \tau_0(1+\alpha) - \alpha\delta$$

$$L1 = R(1/3 + \tau_0) + \alpha R(1/3 + \tau_0 - \delta) \quad (30)$$
$$= 1 - (1/3 + \tau_0) + \alpha(1 - (\delta - 1/3 - \tau_0))$$
$$= 2/3(1+\alpha) - \tau_0(1-\alpha) + 2\alpha/3 - \alpha\delta$$

$$L2 = R(2/3 + \tau_0) + \alpha R(2/3 + \tau_0 - \delta) \quad (31)$$
$$= 1 - (2/3 + \tau_0) + \alpha(1 - (2/3 + \tau_0 - \delta))$$
$$= 1/3(1+\alpha) - \tau_0(1+\alpha) + \alpha\delta$$

The DLL will force E1=L1. The following equations can be derived:

$$\tau_0 = \alpha/3 \quad (32)$$

$$E2 = R(2/3 - \tau_0) = 1 - (2/3 - \tau_0) = 1/3 + \tau_0 \quad (33)$$

$$E1 = R(1/3 - \tau_0) + \alpha R(1/3 - \tau_0 + \delta) \quad (34)$$
$$= (1 - (1/3 - \tau_0)) + \alpha(1 - (1/3 - \tau_0 + \delta))$$
$$= 2/3(1+\alpha) + \tau_0(1+\alpha) - \alpha\delta$$

$$L1 = R(1/3 + \tau_0) + \alpha R(1/3 + \tau_0 - \delta) \quad (35)$$
$$= 1 - (1/3 + \tau_0) + \alpha(1 - (\delta - 1/3 - \tau_0))$$
$$= 2/3(1+\alpha) - \tau_0((1-\alpha) + 2\alpha/3 - \alpha\delta$$

$$L2 = R(2/3 + \tau_0) + \alpha R(2/3 + \tau_0 - \delta) \quad (36)$$
$$= 1 - (2/3 + \tau_0) + \alpha(1 - (2/3 + \tau_0 - \delta))$$
$$= 1/3(1+\alpha) - \tau_0(1+\alpha) + \alpha\delta$$

The multipath delay can be derived by power measurement E2:

$$\tau_0 = E2 - 1/3 \quad (37)$$
or
$$\tau_0 = -1/3 + (E1+L2)/3 \quad (38)$$

If $\alpha \geq 0$ then $$P = R(\tau_0) + \alpha R(\tau_0 - \delta)) \quad (39)$$
$$= 1 - \tau_0 + \alpha(1 - (\delta - \tau_0))$$
$$= 1 + \alpha - \tau_0 + \alpha\tau_0 - \alpha\delta$$

The multipath delay can also be derived by power measurements P and L1:

$$\tau_0 = 1/3 - (P - L1) \quad (40)$$
or
$$\tau_0 = 1/3 - (P - E1) \quad (41)$$
and -continued $$\tau_0 = -2/3 + (P + L2)/2 \quad (42)$$

If $\alpha < 0$ then $$P = R(\tau_0) + \alpha R(\tau_0 - \delta)) \quad (43)$$
$$= 1 + \tau_0 + \alpha(1 - (\delta - \tau_0))$$
$$= 1 + \alpha + \tau_0 + \alpha\tau_0 - \alpha\delta$$

The multipath delay can also be derived by power measurements P and E1:

$$\tau_0 = -1/3 + (P - E1) \quad (44)$$

or $$\tau_0 = -1/3 + (P - L1) \quad (45)$$

and $$\tau_0 = -1/3 + (P + L2)/4 \quad (46)$$

CASE 3: $\tau_0 + \frac{2}{3} < \delta \leq \tau_0 + 1$

No multipath reflection on E2, E1. In this case we have $$E2 = R(2/3 - \tau_0) = 1 - (2/3 - \tau_0) = 1/3 + \tau_0 \quad (47)$$

$$E1 = R(1/3 - \tau_0) = (1 - (1/3 - \tau_0)) = 2/3 + \tau_0 \quad (48)$$

$$L1 = R(1/3 + \tau_0) + \alpha R(1/3 + \tau_0 - \delta) \quad (49)$$
$$= 1 - (1/3 + \tau_0) + \alpha(1 - (\delta - 1/3 - \tau_0))$$
$$= 2/3 + 4\alpha/3 - \tau_0(1 - \alpha) - \alpha\delta$$

$$L2 = R(2/3 + \tau_0) + \alpha R(2/3 + \tau_0 - \delta) \quad (50)$$
$$= 1 - (2/3 + \tau_0) + \alpha(1 - (\delta - 2/3 - \tau_0))$$
$$= 1/3 + 5\alpha/3 - \tau_0(1 - \alpha) - \alpha\delta$$

The DLL will force E1=L1. The following equations can be derived:

$$\tau_0 = \frac{\alpha(4/3 - \delta)}{2 - \alpha} \quad (51)$$

$$\tau_0 = E2 - 1/3 \quad (52)$$

$$\tau_0 = E1 - 2/3 \quad (53)$$

$$\tau_0 = L1 - 2/3 \quad (54)$$

If $\alpha \geq 0$ then $$P = R(\tau_0) + \alpha R(\tau_0 - \delta)) \quad (55)$$
$$= 1 - \tau_0 + \alpha(1 - (\delta - \tau_0))$$
$$= 1 + \alpha - \tau_0 + \alpha\tau_0 - \alpha\delta$$

$$\alpha = 1 + 3(L2 - P)/2 \quad (56)$$

$$\tau_0 = -2/3 + (P + L2)/2 \quad (57)$$

If $\alpha < 0$ then $$P = R(\tau_0) + \alpha R(\tau_0 - \delta)) \quad (58)$$
$$= 1 + \tau_0 + \alpha(1 - (\delta - \tau_0))$$
$$= 1 + \alpha + \tau_0 + \alpha\tau_0 - \alpha\delta$$

$$\tau_0 = -1/3 + (P + L2)/4 \quad (59)$$

CASE 4: $\tau_0 + 1 < \delta \leq 4/3$

No multi-path reflection on E2, E1, P. In this case $$E2 = R(2/3 - \tau_0) = 1 - (2/3 - \tau_0) = 1/3 + \tau_0 \quad (60)$$

$$E1 = R(1/3 - \tau_0) = (1 - (1/3 - \tau_0)) = 2/3 + \tau_0 \quad (61)$$

$$L1 = R(1/3 + \tau_0) + \alpha R(1/3 + \tau_0 - \delta) \quad (62)$$
$$= 1 - (1/3 + \tau_0) + \alpha(1 - (\delta - 1/3 - \tau_0))$$
$$= 2/3 + 4\alpha/3 - \tau_0(1 - \alpha) - \alpha\delta$$

$$L2 = R(2/3 + \tau_0) + \alpha R(2/3 + \tau_0 - \delta) \quad (63)$$
$$= 1 - (2/3 + \tau_0) + \alpha(1 - (\delta - 2/3 - \tau_0))$$
$$= 1/3 + 5\alpha/3 - \tau_0(1 - \alpha) - \alpha\delta$$

The DLL will force E1=L1. The following equations can be derived:

$$\tau_0 = \frac{\alpha(4/3 - \delta)}{2 - \alpha} \quad (64)$$

$$\tau_0 = E2 - 1/3 \quad (65)$$

$$\tau_0 = E1 - 2/3 \quad (66)$$

or $$\tau_0 = L1 - 2/3 \quad (67)$$

$$L2 = R(2/3 + \tau_0) + \alpha R(2/3 + \tau_0 - \delta) \quad (68)$$
$$= 1 - (2/3 + \tau_0) + \alpha(1 - (\delta - 2/3 - \tau_0))$$
$$= 1/3 + \alpha/3 + \tau_0$$

If $\alpha \geq 0$ then $$P = R(\tau_0) = 1 - \tau_0 \quad (69)$$

$$\tau_0 = 1 - P \quad (70)$$

If $\alpha < 0$ then $$P = R(\tau_0) = 1 + \tau_0 \quad (71)$$

$$\tau_0 = P - 1 \quad (72)$$

CASE 5: $4/3 < \delta \leq 5/3$

No multipath reflection on E2, E1, P, L1. In this case $$E2 = R(2/3 - \tau_0) = 1 - (2/3 - \tau_0) = 1/3 + \tau_0 \quad (73)$$

$$E1 = R(1/3 - \tau_0) = (1 - (1/3 - \tau_0)) = 2/3 + \tau_0 \quad (74)$$

$$L1 = R(1/3 + \tau_0) = 1 - (1/3 + \tau_0) = 2/3 - \tau_0 \quad (75)$$

$$L2 = R(2/3 + \tau_0) + \alpha R(2/3 + \tau_0 - \delta) \quad (76)$$
$$= 1 - (2/3 + \tau_0) + \alpha(1 - (\delta - 2/3 - \tau_0))$$
$$= 1/3 + 5\alpha/3 - \alpha\delta$$

The DLL will force E1=L1. The following equations can be derived:

$$\tau_0 = 0 \quad (77)$$

$$P = R(\tau_0) = 1 \quad (78)$$

CASE 6: $\delta \geq 5/3$ \quad (79)

No multi-path reflection on all five powers.

The above expressions for $\tau_0$ are summerised FIG. 13. The multipath delay $\tau_0$ can be computed by formula in the third row of FIG. 13 if it is assumed that $\delta$ and $\alpha$ are known.

Figure 5:
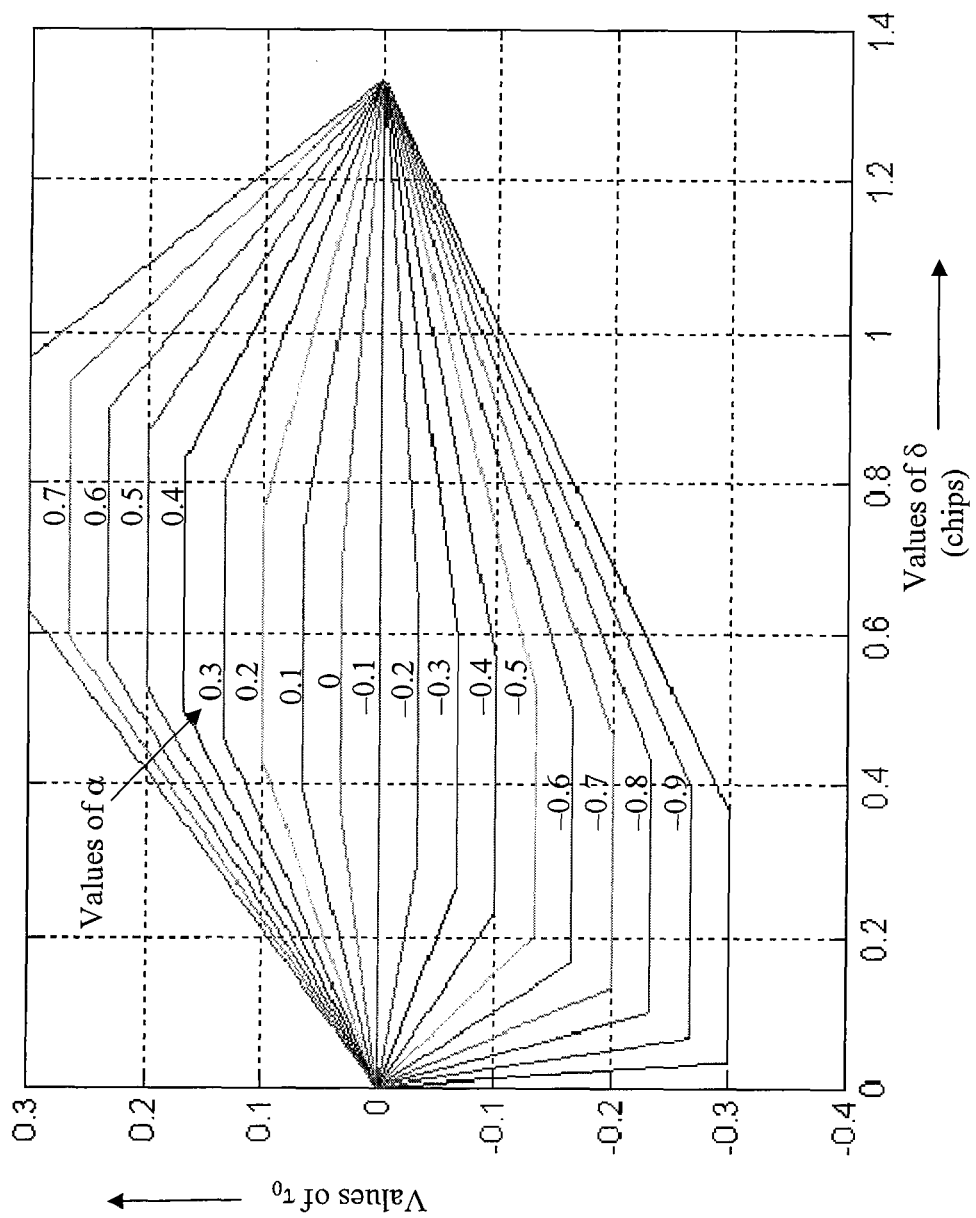
FIG. 5 shows a graph of the theoretical multipath effect as a plot of time shift between the correlation maximum values due to direct and reflected signals ($\tau$) versus the delay in chips ($\delta$).

FIG. 5 shows the theoretical multipath effect based on δ and alpha. However, in reality, δ and α can not be measured and the only measurements are E2, E1, P, L1 and L2.

The L2 should not be used because L2 will still be affected by multipath $\delta \geqq 4/3$ until $\delta \geqq 5/3$ although $\tau_0=0$.

Figure 6:
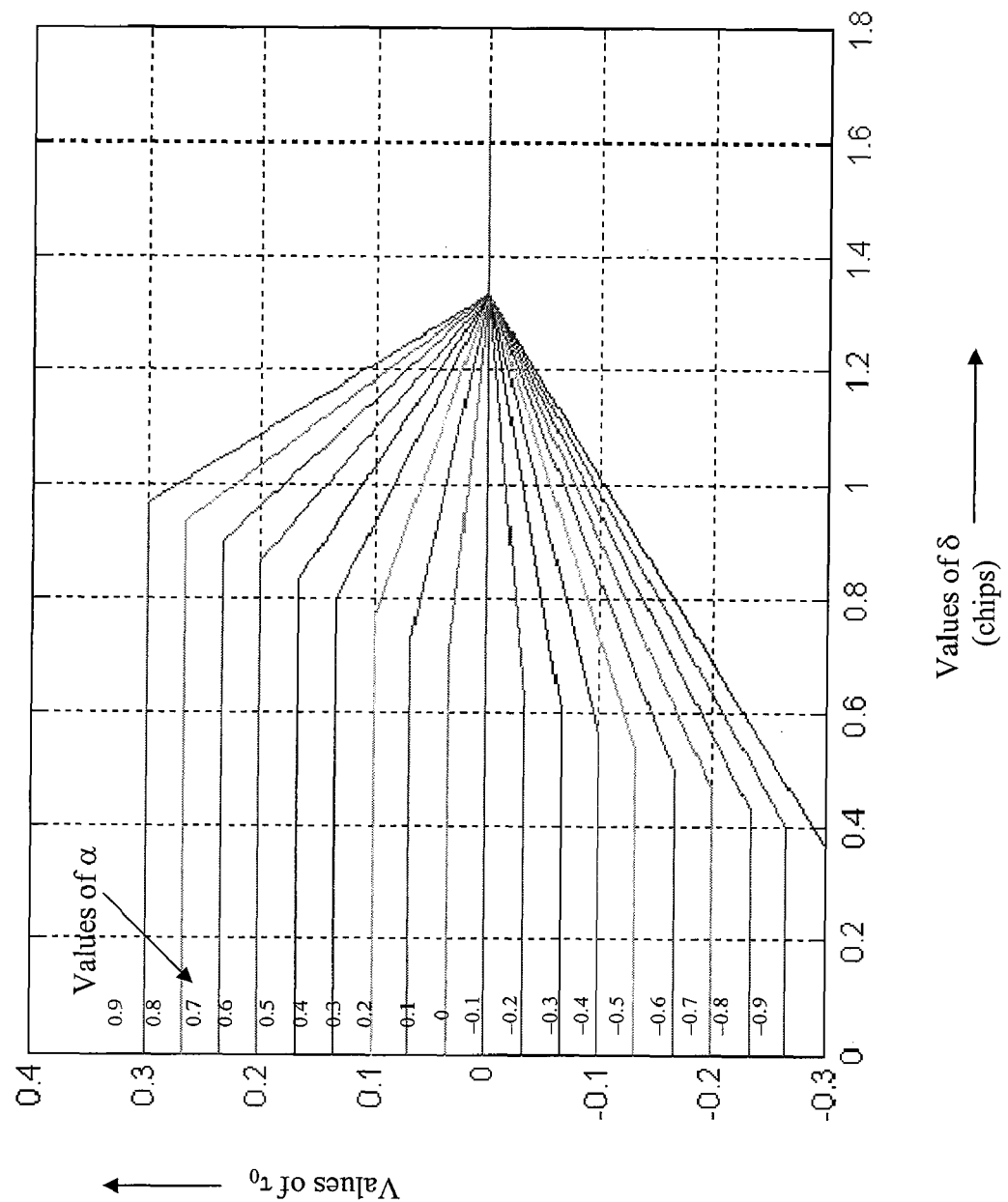
FIG. 6 shows the multipath correction using $\tau_0$=E2–⅓.
Figure 7:
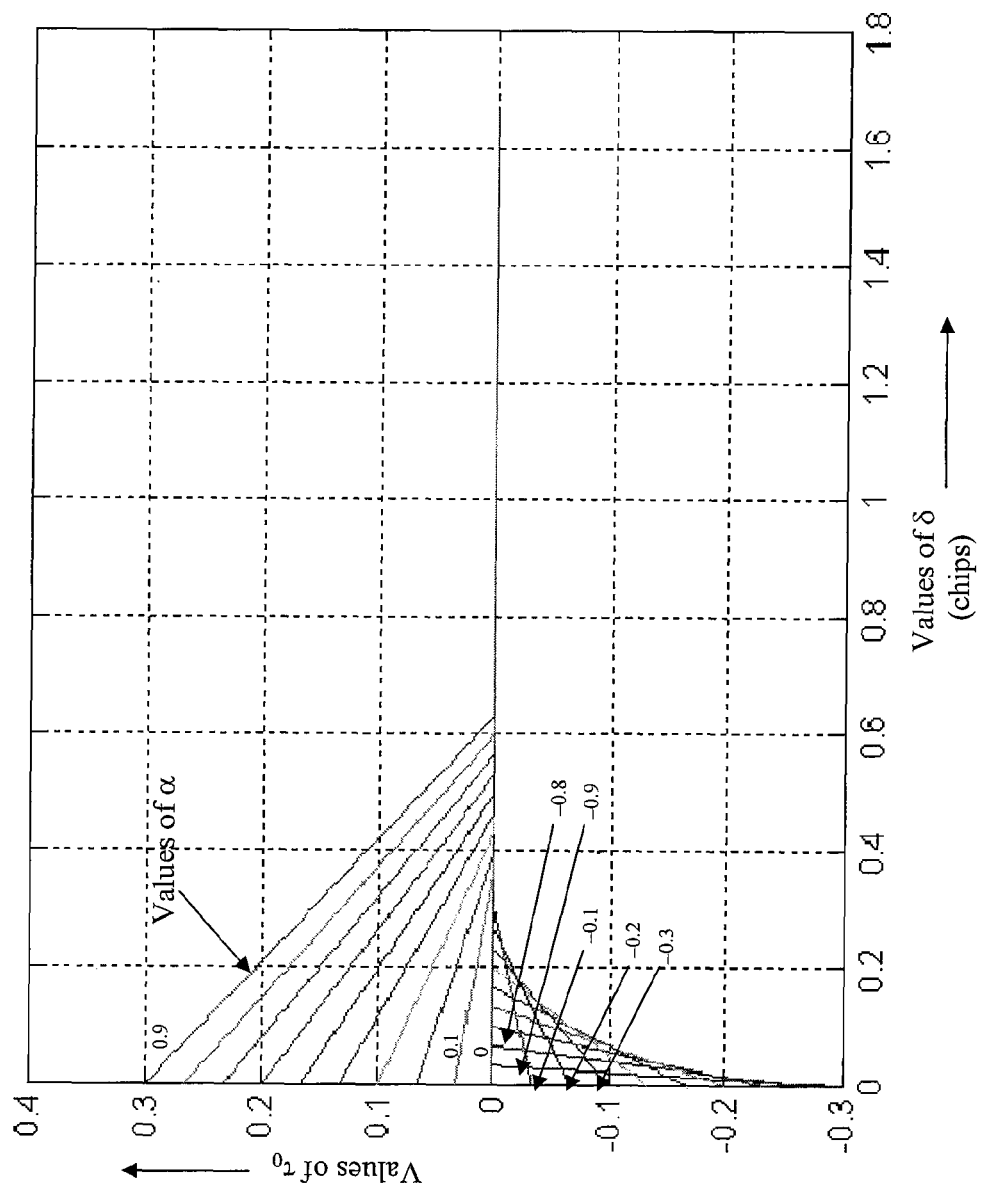
FIG. 7 shows the multipath correction bias using $\tau_0$=E2–⅓.

From summary FIG. 13, the following three methods may be concluded:

Method 1: $\tau_0=E2-\frac{1}{2}$ is applied for Cases 2-6 no matter what the value of α. FIG. 6 shows the computed multipath delay using this formula. Comparing with FIG. 5, it can be seen the formula has been biased for case 1 which is shown in FIG. 7.

Figure 8:
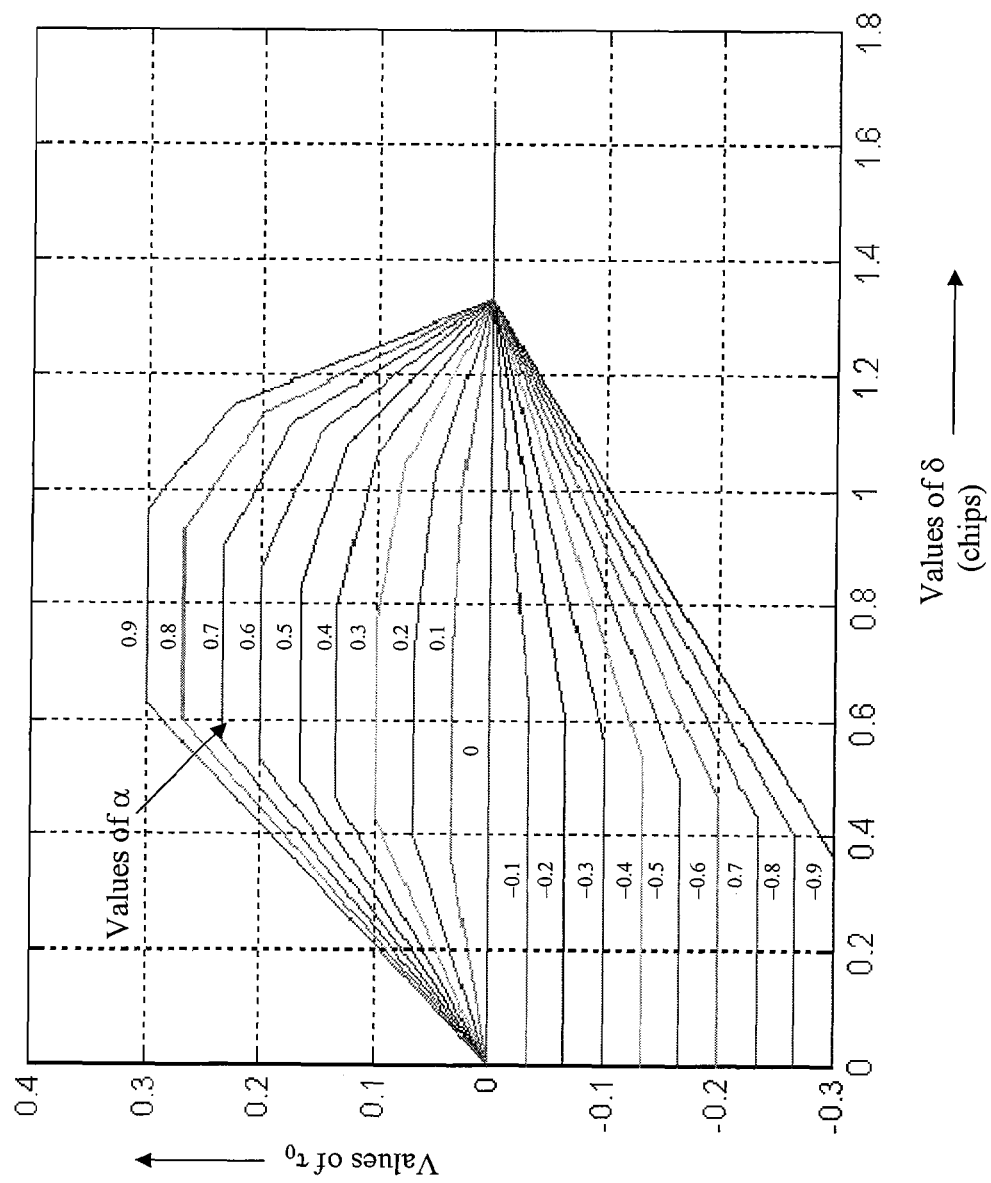
FIG. 8 shows the multipath correction when E1+E2>P and E1+E2<P based on E1 and E2.
Figure 9:
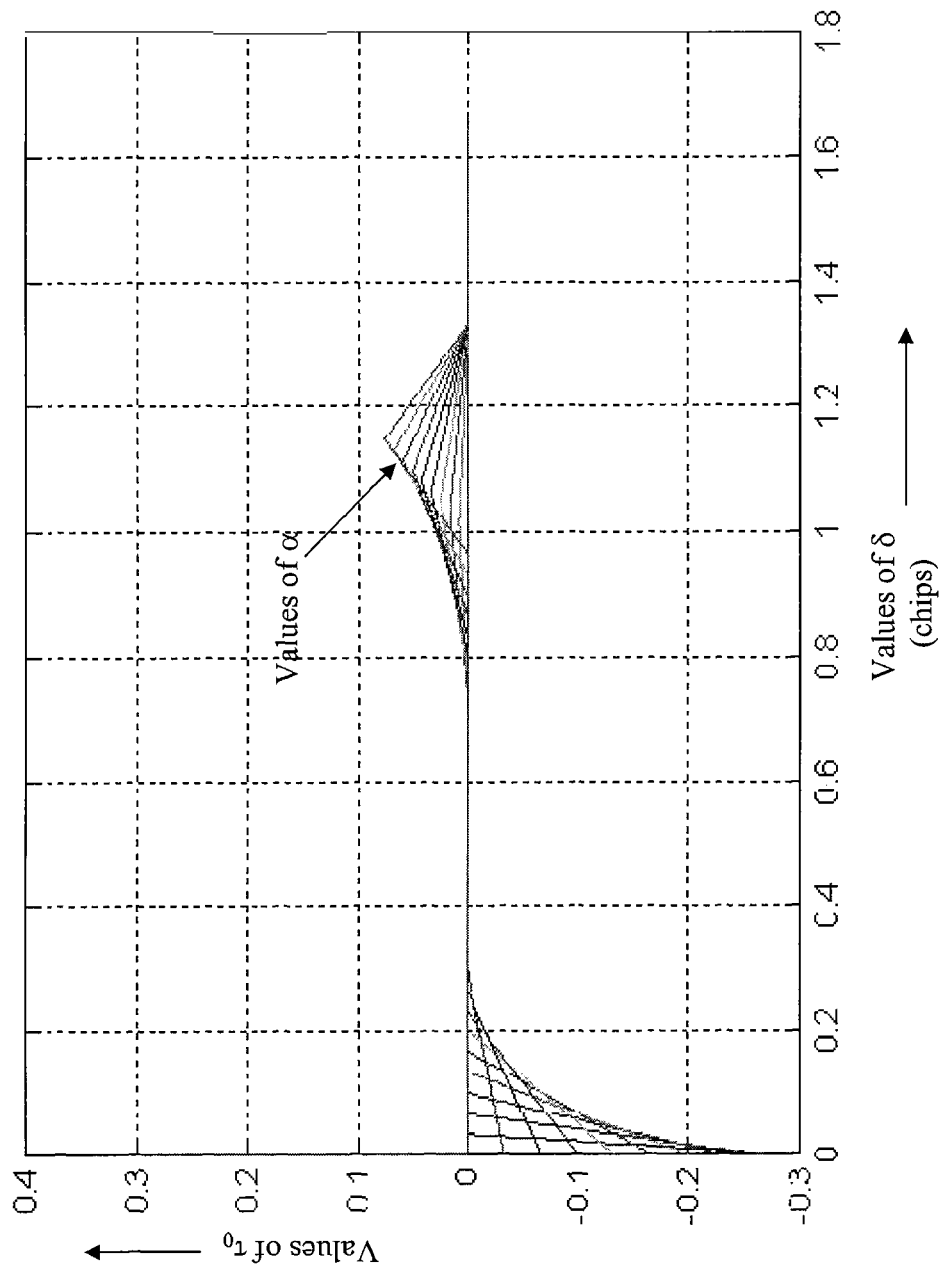
FIG. 9 shows the multipath error for FIG. 8.

Method 2: If $\alpha \geqq 0$, we can have E1+E2>P and if $\alpha \leqq 0$, we can have E1+E2<P. When E1+E2>P, $\tau_0=(E1+E2)/2-P/2$ will be applied. Otherwise $\tau_0=E2-\frac{1}{3}$ is applied. FIG. 8 gives multipath corrections and FIG. 9 gives the biases.

Figure 10:
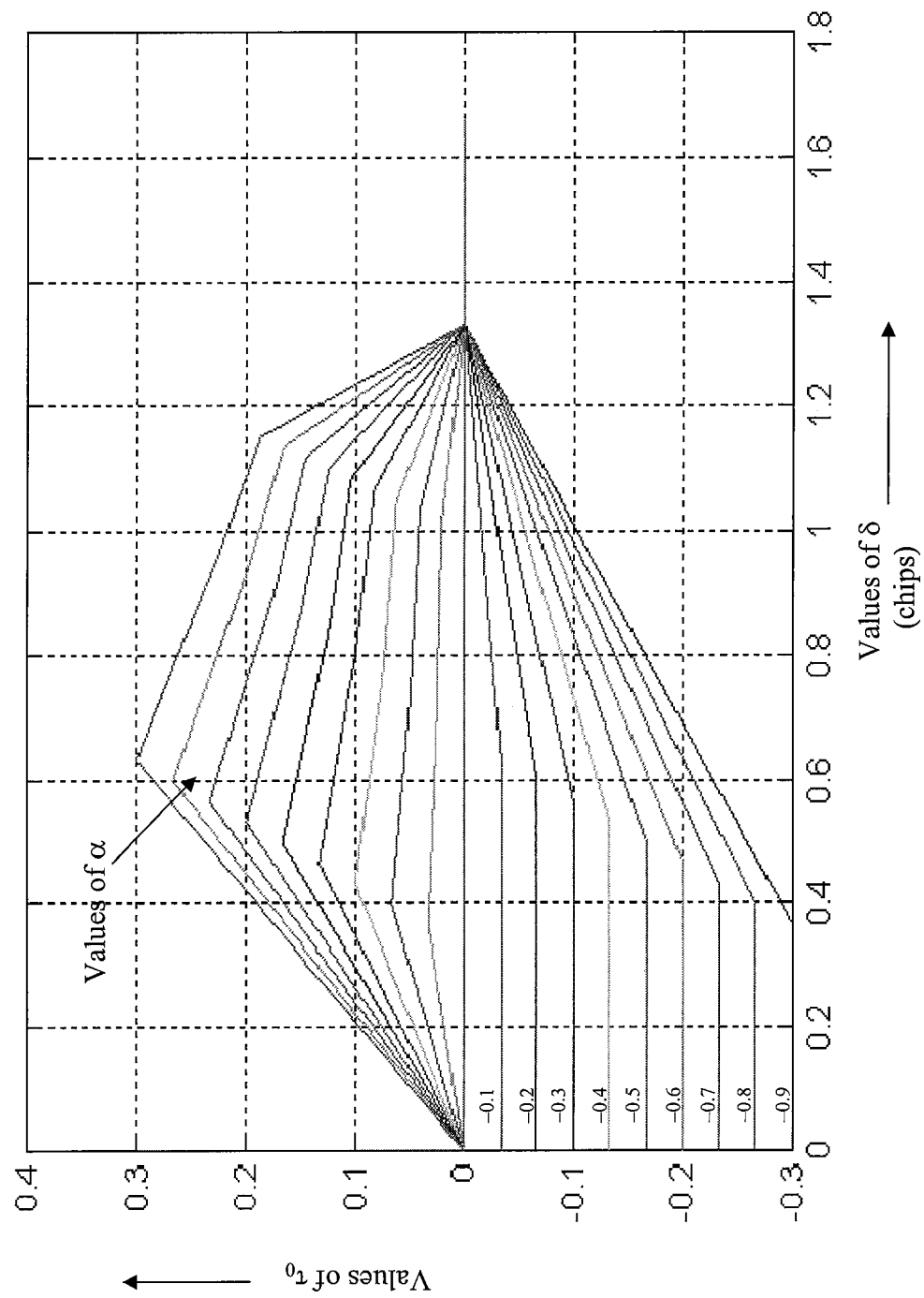
FIG. 10 shows the multipath correction when E1+E2>P and E1+E2<P based on E1 and L1.
Figure 11:
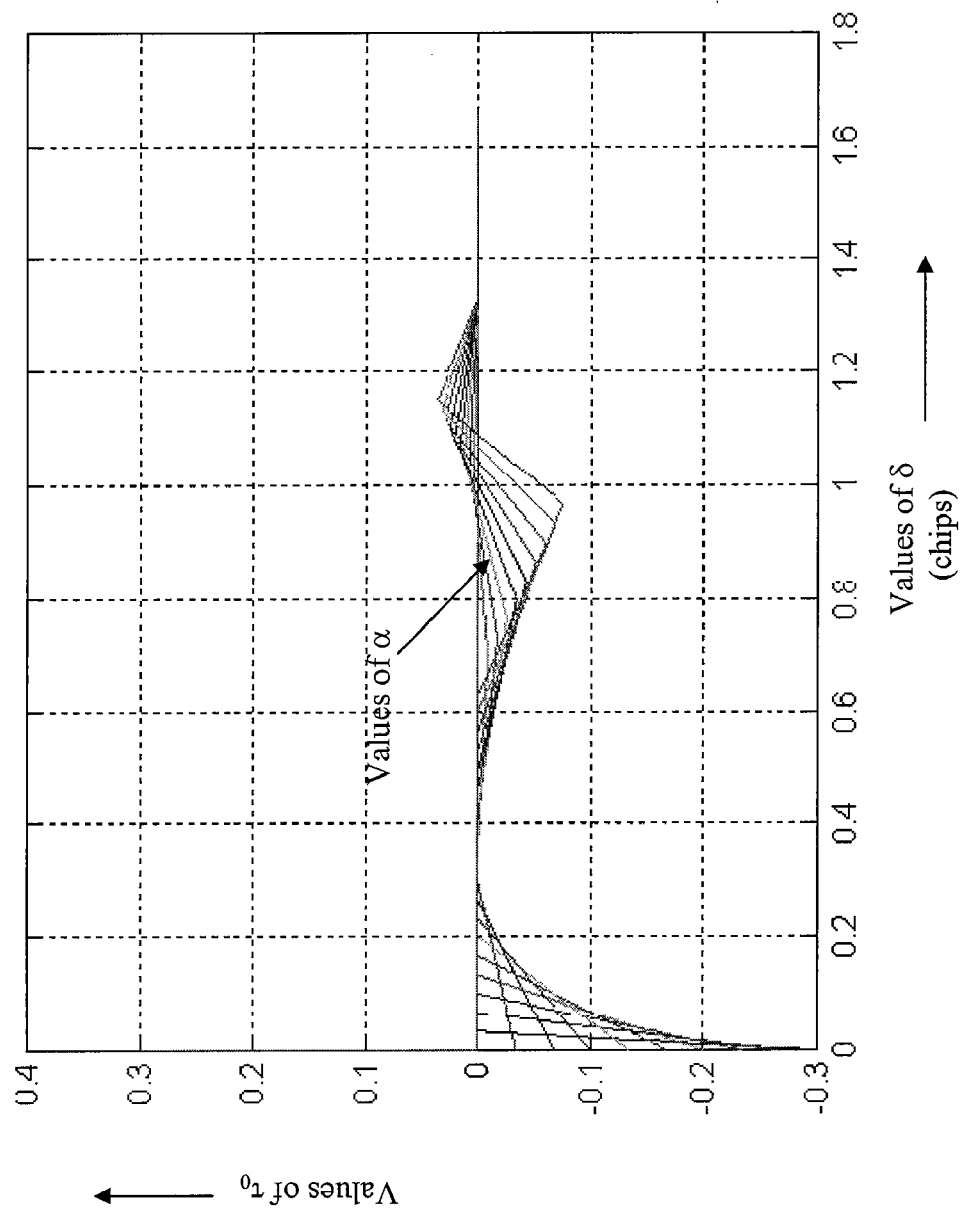
FIG. 11 shows the multipath error for FIG. 10.

Method 3: There is an alternative for above case. When E1+E2>P, $\tau_0=3(E1+L1)/8-P/2$ will be applied. Otherwise $\tau_0=E2-\frac{1}{3}$ is applied. FIG. 10 illustrates the multipath corrections and FIG. 11 shows the biases.

Figure 14:
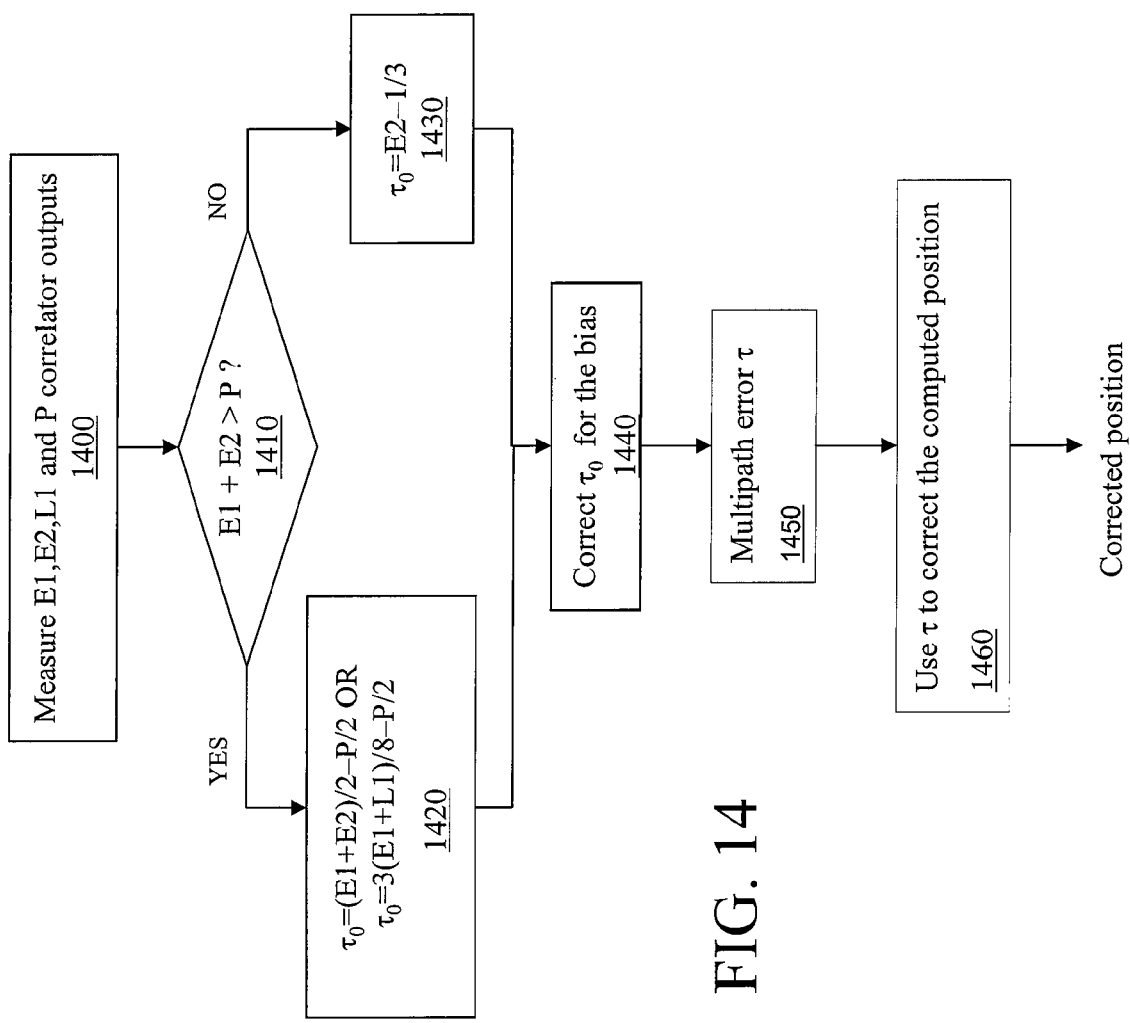
FIG. 14 is a flowchart illustrating a multipath error estimation technique according to an embodiment of the invention.

In most of the cases, the methods 2 and 3 are used. This has been illustrated in the flowchart shown in FIG. 14. According to this flowchart, the values of E1, L1, E2 and P are measured (step 1400) under multipath condition. If the value of (E1+ E2) is greater than P (step 1410) then $\tau_0$ is computed using either $\tau_0=(E1+E2)/2-P/2$ or $\tau_0=3(E1+L1)/8-P/2$ (step 1420). When (E1+E2)<P, then $\tau_0=E2-\frac{1}{3}$ is applied (step 1430). These values are corrected with the already known biases (step 1440) as shown in FIG. 9 and FIG. 10 to obtain the actual correction value τ (step 1450). This corrected value of the multipath error is used to correct the estimated position (1460). If only the value of E2 is available then the formula $\tau_0=E2-\frac{1}{2}$ of method 1 is applied.

There are two practical issues when the algorithm is implemented in the system.

1. All the power values in the above derivation have been unified as 1 for P under the condition that there is no multipath.

2. E1 and L1 are not exactly at ⅔ unified value, and E2 and L2 are not at ⅓ unified values.

Accordingly, the method of the invention may also include refining a code-phase increment by averaging a ratio of the power of a second correlator to a prompt correlator. For Method 1, the ⅓ point can be replaced by x(k), given by a smoothing formula, e.g., the moving average $$x(k) = \frac{N-1}{N}x(k-1) + \frac{e2(k)}{N \cdot p(k)}. \tag{80}$$

If $N > N_{max}$, let $N=N_{max}$. The value of $N_{max}$ (the averaging period) preferably should be larger than a maximum period of multipath. Normally the period of 10 minutes is a good number which means that $N_{max}=600$ when measurement interval is 1 second. And E2 will be replaced by $$\frac{e2(k)}{p(k)}.$$

Where $e2(k)$ and p(k) are original power values for E2 and P. The practical formula for computation of the error in position is then given by:

$$MP(k) = \frac{\gamma}{x(k)}\left[\frac{e2(k)}{p(k)} - x(k)\right] \cdot \frac{c}{1023000} \tag{81}$$

where γ is obtained by experimentation, and c is the speed of light.

The experiment results from different data sets show that the positioning accuracy (standard deviation) can be improved 20-30%. Thus, already available power values from different correlators may be used to improve accuracy of the estimated time delay error and positioning accuracy.

Figure 12:
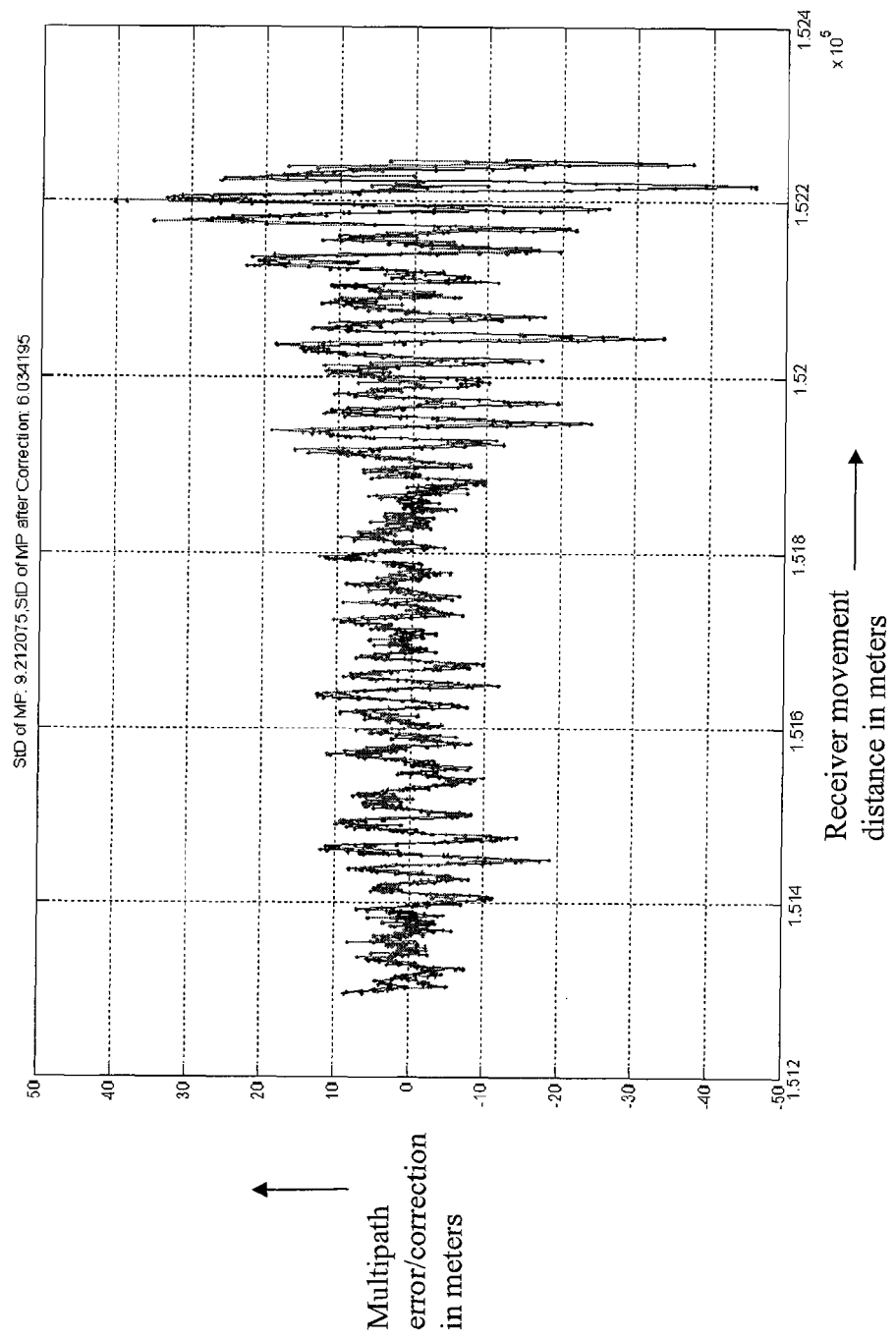
FIG. 12 shows the measured and computed multipath correction data for PRN 20.

FIG. 12 shows multipath corrections (red line) and measured multipath (blue line) for PRN 20. The blue line includes ionosphere effect.

Since the positioning accuracy are highly affected by both ionosphere and multipath. 30% of positioning accuracy improvement means that the multipath itself has been mitigated by over 50%.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

The invention claimed is:

1. A method of detecting and compensating for receiver timing errors due to multi-path in a spread spectrum receiver, the method comprising:
   receiving signals from a remote transmitter;
   generating a local PN sequence;
   correlating the received signals with the local PN sequence at five different code phases to produce five corresponding correlation values, wherein the five different code phases are separated by an interval of at least one-third of a chip of the local PN sequence;
   estimating from at least one of the five correlation values a time delay error due to the multi-path;
   compensating a receiver timing error due to the multi-path using the estimated time delay error; and
   refining a code-phase increment by averaging a ratio of the power of a second correlator to a prompt correlator.

2. The method of claim 1 wherein the time delay error is estimated using a single mathematical expression for all delays and polarities of a received reflected signal.

3. The method of claim 1 wherein estimating the time delay error comprises determining one of multiple formulas from the correlation values, and calculating the time delay error using the determined formula.

4. The method of claim 1 wherein the averaging is a moving average.

5. The method of claim 1 wherein the averaging uses an averaging period larger than a multipath period.

6. The method of claim 1 wherein the estimating uses already available power values from different correlators to improve accuracy of the estimated time delay error.

7. A spread spectrum receiver device comprising an RF front end for receiving spread spectrum signals from a transmitter, a baseband section receiving IF signals from the RF front end, and a processor receiving baseband signals from the baseband section, wherein the processor implements a method of detecting and compensating for error due to multi-path in the spread spectrum receiver device, the method comprising:

generating and storing of samples of received signal;

generating samples of replica PN sequence;

correlating the received signal with the local replica at five different consecutive code phases at an interval of approximately at least one-third of a chip of the PN sequence;

estimating the time delay error due to the multi-path based on the power of the said five correlators;

compensating the timing error of the receiver due to the multi-path; and refining a code-phase increment by averaging a ratio of the power of a second correlator to a prompt correlator.

8. The device of claim 7 wherein the time delay error is estimated using a single mathematical expression for all delays and polarities of a received reflected signal.

9. The device of claim 7 wherein estimating the time delay error comprises determining one of multiple formulas from the correlation values, and calculating the time delay error using the determined formula.

10. The device of claim 7 wherein the averaging is a moving average.

11. The device of claim 7 wherein the averaging uses an averaging period larger than a multipath period.

12. The device of claim 7 wherein the estimating uses already available power values from different correlators to improve accuracy of the estimated time delay error.

13. A method of estimating a multi-path related error in a spread spectrum receiver, the method comprising:

receiving a signal from a remote transmitter;

generating a local PN sequence corresponding to a unique PN sequence of the remote transmitter;

correlating the received signal with the local PN sequence at more than three different code phases to produce a prompt correlation measurement and three or more early and late correlation measurements, wherein the different code phases are separated by an interval of less than one-half of a chip of the local PN sequence;

comparing certain of the correlation measurements against each other; and estimating a time delay error due to the multi-path related error using a selected one of a plurality of different predetermined mathematical combinations of one or more of the correlation measurements, wherein the selection of the one mathematical combination is based on the comparison.

14. The method of claim 13, wherein the remote transmitter comprises a transmitter in a satellite navigational system, the method further comprising correcting an estimated position of the spread spectrum receiver using the estimated time delay error.

15. The method of claim 13, further comprising correcting the estimated time delay error using a known bias associated with the selected one mathematical combination.

16. The method of claim 13, further comprising:

determining a smoothed value of one of the correlation measurements used in the selected one mathematical combination; and substituting the smoothed value for the one correlation measurement in the selected one mathematical combination.

17. The method of claim 16, wherein determining the smoothed value comprises computing a moving average of a plurality of past values of the one correlation measurement.

18. The method of claim 13, wherein the more than three different code phases comprises five different code phases, and the early and late correlation measurements comprise two early and two late correlation measurements.

* * * * *

UNITED STATES PATENT AND TRADEMARK OFFICE
CERTIFICATE OF CORRECTION

PATENT NO. : 8,170,085 B2
APPLICATION NO. : 11/372739
DATED : May 1, 2012
INVENTOR(S) : Han

Page 1 of 2

It is certified that error appears in the above-identified patent and that said Letters Patent is hereby corrected as shown below:

On the Title Page, in Field (56), under "OTHER PUBLICATIONS", in Column 2, Line 6, delete "Recceiver" and insert -- Receiver --, therefor.

In Column 2, Line 56, delete "Inc" and insert -- Inc. --, therefor.

In Column 6, Line 41, in Equation (4), delete "$P=R(\tau_0)+\alpha R(\tau_0-\delta))$" and insert -- $P=R(\tau_0)+\alpha R(\tau_0-\delta)$ --, therefor.

In Column 7, Line 7, in Equation (9), delete "$P=R(\tau_0)+\alpha R(\tau_0-\delta))$" and insert -- $P=R(\tau_0)+\alpha R(\tau_0-\delta)$ --, therefor.

In Column 7, Line 9, in Equation (10), delete "(10) (10)" and insert -- (10) --, therefor.

In Column 7, Line 49, in Equation (21), delete "$P=R(\tau_0)+\alpha R(\tau_0-\delta))$" and insert -- $P=R(\tau_0)+\alpha R(\tau_0-\delta)$ --, therefor.

In Column 7, Line 60, in Equation (25), delete "$P=R(\tau_0)+\alpha R(\tau_0-\delta))$" and insert -- $P=R(\tau_0)+\alpha R(\tau_0-\delta)$ --, therefor.

In Column 8, Line 37, in Equation (35), delete "$-\tau_0((1-\alpha)+2\alpha/3-\alpha\delta$" and insert -- $-\tau_0((1-\alpha)+2\alpha/3-\alpha\delta)$ --, therefor.

In Column 8, Line 53, in Equation (39), delete "$P=R(\tau_0)+\alpha R(\tau_0-\delta))$" and insert -- $P=R(\tau_0)+\alpha R(\tau_0-\delta)$ --, therefor.

In Column 9, Line 5, in Equation (43), delete "$P=R(\tau_0)+\alpha R(\tau_0-\delta))$" and insert -- $P=R(\tau_0)+\alpha R(\tau_0-\delta)$ --, therefor.

Signed and Sealed this
Nineteenth Day of March, 2013

Teresa Stanek Rea
*Acting Director of the United States Patent and Trademark Office*

In Column 9, Line 51, in Equation (55), delete "$P=R(\tau_0)+\alpha R(\tau_0-\delta))$" and insert -- $P=R(\tau_0)+\alpha R(\tau_0-\delta)$ --, therefor.

In Column 9, Line 59, in Equation (58), delete "$P=R(\tau_0)+\alpha R(\tau_0-\delta))$" and insert -- $P=R(\tau_0)+\alpha R(\tau_0-\delta)$ --, therefor.